Aug. 28, 1962    T. S. HARRIS, JR    3,051,382
CARD CONTROLLED SWITCH DEVICE
Filed Dec. 9, 1958    3 Sheets-Sheet 1

FIG. I

INVENTOR.
THOMAS S. HARRIS JR.
BY
John J. Rogan
ATTORNEY

Aug. 28, 1962　　　T. S. HARRIS, JR　　　3,051,382
CARD CONTROLLED SWITCH DEVICE
Filed Dec. 9, 1958　　　　　　　　　　　　3 Sheets-Sheet 2

INVENTOR.
THOMAS S. HARRIS JR.
BY
John J. Rogan
ATTORNEY

Aug. 28, 1962　　　T. S. HARRIS, JR　　　3,051,382
CARD CONTROLLED SWITCH DEVICE
Filed Dec. 9, 1958　　　　　　　　　3 Sheets-Sheet 3
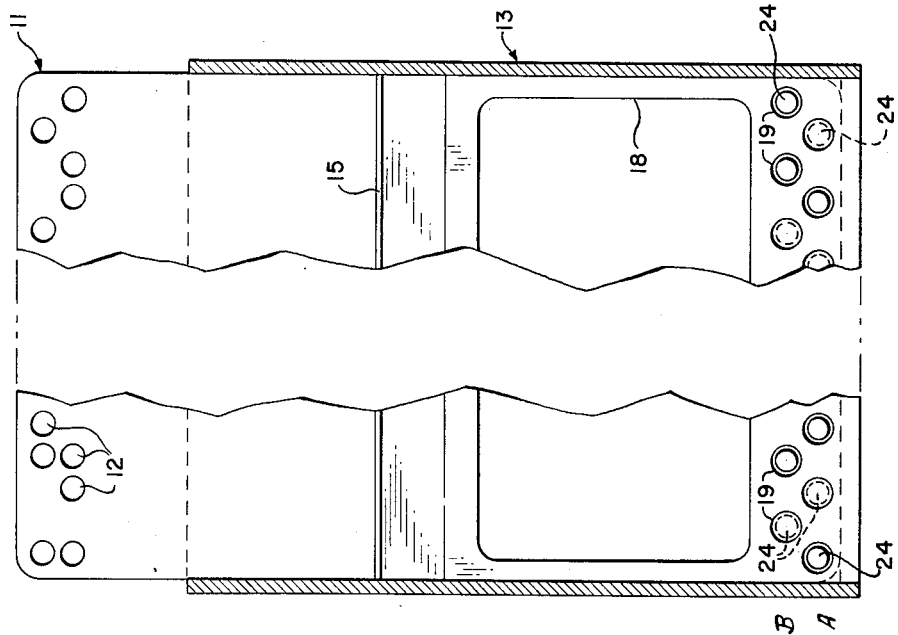
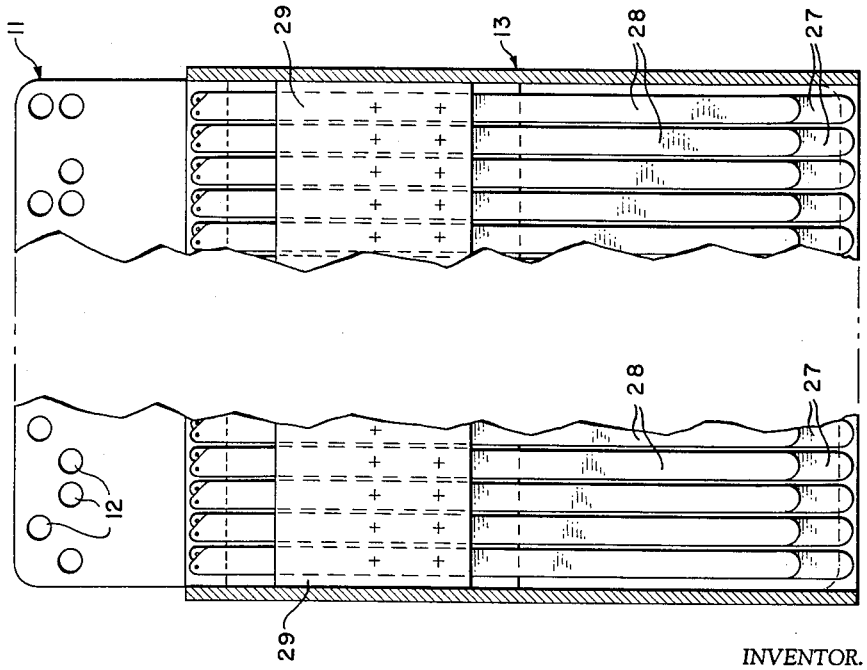
INVENTOR.
THOMAS S. HARRIS JR.
BY
John J. Logan
ATTORNEY United States Patent Office 3,051,382
Patented Aug. 28, 1962

3,051,382
CARD CONTROLLED SWITCH DEVICE
Thomas S. Harris, Jr., Stamford, Conn., assignor to The Teleregister Corporation, Stamford, Conn., a corporation of Delaware
Filed Dec. 9, 1958, Ser. No. 779,138
8 Claims. (Cl. 235—61.11)

This invention relates to destination cards or plates and readers therefor employed in automatic reservation systems, and more particularly to improvements therein whereby the utility of a card and reader is increased.

In automatic airline reservation systems such as the system used by a number of the major airlines, information regarding the availability of reservable seats or reservations on any one of a number of flights such as a hundred, or any leg thereof, for a number of days in advance, up to as many as 180, are kept in a central inventory and the inventory changed as reservations are made and canceled. Access to the inventory by any of a number of remotely located agents is effected through the use of so-called destination control plates and a plate reader located at the agent's place of business and electrically connected to the central inventory equipment. When an agent desires information about reservations to a certain city, a destination plate showing flights to that city is inserted in the plate reader and certain keys of one group in the reader are operated to identify the flight date and number of seat reservations to be processed. The individual keys of another group of keys when operated then will identify the action such as query as to availability, sell, cancel, check arrival or departure status, or others as the case may be. The answer to the query or instructions is displayed by the selective lighting of certain lights in the reader. A typical known destination plate and agent's keyset are described in "Electrical Manufacturing" for October 1953, article by Craig Andrews and H. R. Quick. Another typical plate is described in U.S. Patent No. 2,564,410 to E. L. Schmidt.

In the above mentioned system each destination plate has series of coded notches along two opposite edges thereof to represent groups of destinations. When the notches along one edge of the plate are inserted in the reader, electrical switches in the reader are operated in a combination corresponding to the notched and non-notched positions along that edge, and the queries and/or instructions made by the reader only relate to one group of destinations. With the plate rotated 180 degrees and the notches along the opposite edge of the plate inserted in the reader, the query and/or instructions relate to another group of destinations represented by the plate.

With the above arrangement each agent must have at least one plate for a given number of destinations and a relatively large number of such plates are required for a reservation system such as that of a large airline which may serve hundreds of destinations. Furthermore, some or all of the plates may be used many times over and over again during a day, and in order that the projections or sections between the notches along the edges of the plates withstand the hard use, the plates were heretofore made of steel. With such plates, information relating to the particular destination or groups of destinations for which a plate is notched needs to be prepared on a paper and subsequently adhered to the plate. Considerable care is required to insure proper location and orientation of the paper on the plate. Such arrangements require considerable time and expense in the preparation of the plates.

Another disadvantage of the edge notched selection plates is that the notch-reading electrical contacts in the reader with which the plates are used, must be separated sufficiently along the width of the plate in order that they be correctly operated in accordance with the notched and unnotched positions along the edge of the plate. Such an arrangement therefore limits the number of contacts for a given length of the plate edge carrying the notches.

With the above disadvantages of present day plates and plate readers in mind, it is one of the principal objects of the present invention to provide an improved card and card reader, which for a given size of card has a greater number of coding positions or combinations.

Another object of the invention is to provide a coded control card, with other things being equal, that is structurally stronger and more durable than the prior notched edge cards.

Still another object of the invention is to provide a card upon which discrete groups of information relating to selective operations that the card controls can be directly imprinted or otherwise recorded on the card.

Still another object of the invention is to arrange the electrical contacts in the reader and the code positions in a card in such a manner that the opposite faces of a card in a given area, such as along an edge thereof, may represent different and independent control coded combinations.

More specifically, another object of the present invention is to provide a plurality of coding levels or areas near a card edge arranged in such a manner that code perforations representing information on one face of the card do not interfere with the sensing of code perforations in the same general area representing other information on the opposite face of the card. In other words, perforations in the same coextensive area adjacent an edge of a card will represent one code combination when sensed from one face thereof and a different and independent code combination when sensed from the opposite side. Thus each incremental area along an edge of a card by being perforated in one or the other of two distinct levels or control arrays of perforations, can represent two independent and different codes depending upon which face of the card is being used for reading control, whereas in the case of notched cards only one notch array can be made in the equivalent area; and other things being equal, the effective coding area of a card is doubled according to the invention.

The above and further features, objects and advantages of the present invention will be more apparent from the following detailed description of an illustrative embodiment thereof wherein reference is made to the accompanying drawings, in the latter of which:

FIG. 4 is a right hand or front view of the card reader section of FIG. 1 with a destination card therein;

FIG. 5 is a left hand or rear view of the card reader section of FIG. 1 with a destination card therein;

Figure 2:
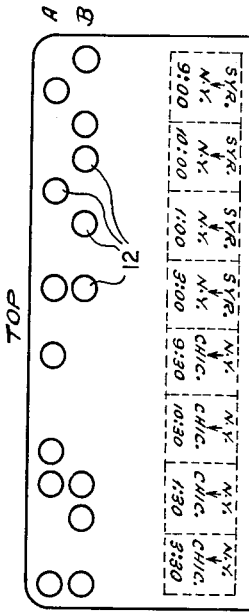
FIG. 2 is a front view of a destination or operation control card of the present invention.
Figure 3:
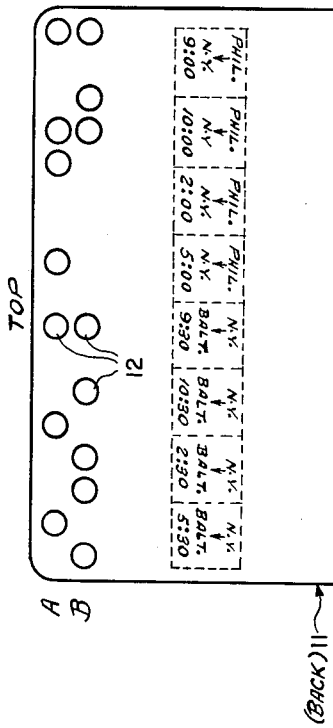
FIG. 3 is a rear view of the same destination card.

Referring now to the drawings and particularly to FIGS. 2 and 3 showing front and rear faces respectively of a control card indicated generally by reference numeral 11, it will be noted that the card has two longitudinal rows or levels A, B of perforations or holes 12 along the upper edge thereof, and two separate longitudinal rows or levels A', B' along the lower edge thereof. The perforations are arranged in a predetermined manner to identify the card and manner of insertion and, as will be pointed out hereinafter, a single card in the preferred embodiment of the invention has, by means of the relative number and location of the perforations, information stored therein relating to as many as four groups of up to eight destinations per group. In the preferred embodiment of the invention the cards would preferably be of paper of suitable thickness and stiffness, and certain information relating to destinations can be printed or otherwise directly recorded thereon, as represented by the blocked areas on the unperforated body of the card.

Figure 1:
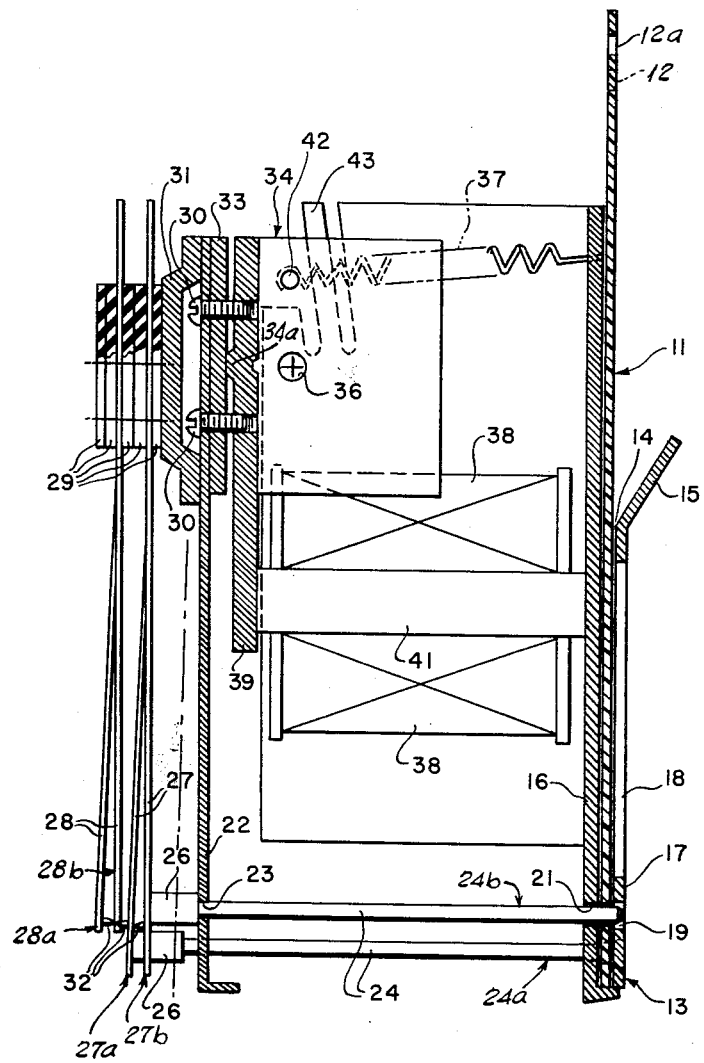
FIG. 1 is a sectional view of a part of a card reader with a destination card or operation control card arranged in accordance with the teachings of the present invention therein.

The card reader indicated generally by reference numeral 13 with which the card 11 cooperates is shown in partial longitudinal section in FIG. 1 and in transverse sections in FIGS. 4 and 5. The reader 13 has on the front or the right hand side as viewed in FIG. 1 a transverse slot 14 formed by a pair of spaced apart plates 16 and 17. The plate 16 is slightly shorter than a card 11 and the plate 17 has an outwardly sloping upper lip 15 to facilitate the placing of a card in the slot 14. The width and length of the slot 14 is such as to permit the card 11 to be easily placed therein while at the same time preventing excess sidewise movement of the card. The plate 17 also has an opening 18 in the face thereof to permit information recorded on the card to be viewed from the front of the reader.

As shown in FIG. 4, the plate 17 has in the lower edge thereof two longitudinal rows or levels of holes 19 arranged in a staggered or offset relationship. The holes 19 or rows A and B are in direct alignment with similar arrays of holes 21, FIG. 1, in the lower edge of plate 16. Likewise, a rearwardly disposed plate 22 of the reader has a similar two-row array of holes 23 therein, and adapted for longitudinal movement in the aligned sets of holes in plates 16 and 22 are a corresponding set of pins or rods 24. The diameter of the pins 24 is somewhat less than the diameter of the holes in the plates 16 and 22, wherein the pins are guided in their movement. The holes 19 in the plate 17 are clearance holes for the ends of the pins 24 and are slightly larger than the holes 21. Also, the holes 12 in the cards are preferably somewhat larger than the holes in the guide plates so as to permit free movement of the pins therethrough without requiring absolute alignment of the card holes with the ends of the pins, although in no event, when a card is inserted, is there lack of sufficient alignment for the pins to pass therethrough.

The pins 24 have shoulders 26 at their left hand ends as seen in FIG. 1, and bearing on the left hand ends of the shoulders are the lower ends of individual spring elements 27, which thus bias the associated pins so that the shoulders 26 abut against plate 22. Each spring element 27 has an associated spring element 28 in operative relation therewith, and each such pair forms a set of electrical contacts. The spring element pairs 27 and 28 are suitably and insulatively mounted with respect to one another, and are anchored at their upper ends between insulating strips 29 attached to a channel member 31. At the lower ends the spring elements 27 and 28 have cooperating contacting points 32.

The channel member 31 is secured together with an intervening spacer 33 to the upper left hand face of the plate 22. The elements 22, 31 and 33 are attached to a U-shaped member 34 by means of the screws 30. It should be observed that the member 34 has a ridge 34a against which the member 33 bears so that by suitable adjustment of the screws 30 the normal position of the plate 22, with respect to the member 34, can be adjusted.

The member 34 is pivotally mounted on a pivot rod 36 and a spring 37 attached to member 34 tends to rock that member together with the attached members, in a clockwise direction as viewed in FIG. 1. A suitable stop 42 limits the clockwise pivoting of the member 34 by reason of the said member abutting against the adjustable tab 43. A solenoid magnet 38 is suitably mounted in the reader 13 with the core thereof in a horizontal position. The left hand end of the said core is then in operative relation with a depending section 39 of member 34.

When the magnet 38 is deenergized, the plate 22 is held by spring 37 in the dot-dash line position indicated in FIG. 1, where it engages the shoulders 26 on all the pins, thus holding the pins in their retracted or rear position so that their forward ends do not protrude through the holes 21. This allows a card 11 to be dropped freely into the slot 14. It should be observed that when the plate 22 is in its normal position, the spring pressure of each of the contact springs 27, 28 on the left hand ends of the associated pins 24 tends to urge the said pins to the right. If, therefore, a hole exists in the card in alignment with any given pin, then when magnet 38 is energized and the plate 22 moved to its operative position, as seen in cross section in FIG. 1, the spring pressure of the associated contact spring pushes the associated pin to the right. However, in moving to the right together with plate 22, the associated contact pair also moved without changing their relative spacing. Thus, they remain in their open or out-of-contact relation. On the other hand, when such a pin is in alignment with an imperforated portion of the card, then when magnet 38 is energized the said pin is stopped against further movement to the right by engagement with the card. Therefore, the left end of the stopping pin cannot move any further. Consequently when plate 22 rocks to the position shown in FIG. 1, the spring element 27 associated with the stopped pin cannot move, but the associated spring element 28 moves the plate and thus closes with the associated contacts 32 on the spring elements. Thus, as shown in FIG. 1, the pin 24a is in a blocked position and contacts 32 on spring elements 27a, 28a are closed. However, the contacts 32 on spring elements 27b, 28b, associated with the pin 24b, remain in their open position. Thus the various pairs of spring elements 27 and 28 are set in closed and open positions in accordance with the various perforations 12 in a card 11 in registry with the pins. When the circuit to the magnet 28 is interrupted, the spring 37 rocks the plate 22 which engages the undersides of the shoulders 26 on the pins 24 to withdraw the ends of the pins from engagement with the card 11.

Figure 6:
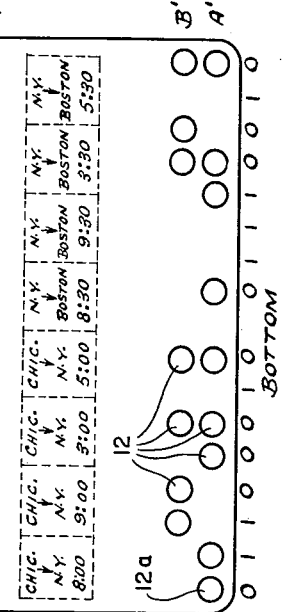
FIG. 6 is a composite view of card and reader perforations showing one particular coded combination resulting from the use of the card in one of its four possible control positions.
Figure 7:
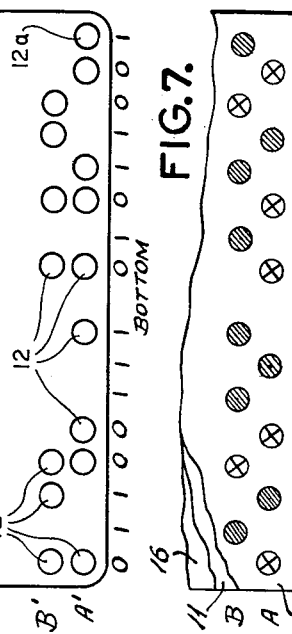
FIG. 7 is a view similar to FIG. 6, but with the card turned back-to-front to produce a different coded combination.

As seen in FIGS. 4 and 6, the holes 19 in the plates 16, 17 are arranged in two levels designated A, B with the holes in the two levels equally spaced in staggered relation, and with the same number of holes, for example eight, in each level. Consequently the pins 24 are also equal in number to, and arranged in alignment with, the holes in the said two levels. For illustrative purposes to be described hereinbelow, the showing of FIG. 6 is located directly beneath a typical perforated card 11 wherein there are two levels of perforations A, B, the two levels constituting two separate arrays of coded perforations adjacent the lower edge of the card; and two other similar levels A', B' at the opposite margin of the card constituting separate arrays of coded perforations. In FIG. 6 each circle represents the holes in the plates 16, 17. The cross in certain of the circles represents the forward location of a corresponding pin, such for example as the pin 24b (FIG. 1), on the assumption that the card 11 has been inserted with the levels A and B in registry with the pins. A cross-hatched circle in FIGS. 6 and 7 therefore represents a pin which is blocked against moving to its forward position by reason of the absence of a perforation in the card, and therefore such a cross-hatched circle represents a closed contact set, whereas the circles with crosses represent an open contact set.

With the above arrangement of holes 19 and 21 and rods 24 it can be seen that a card 11 placed in the reader 13 with the front side such as that shown in FIG. 2 facing outward, the first pin 24 beginning at the left in the bottom level of pins would be opposite the perforation 12a in the card. Also, the first pin 24, beginning at the left in the upper or second level of pins, would be opposite a nonperforated section of the card in its code position. Thus on energization of the magnet 38 the contacts for the first pins of the bottom and upper levels would assume open and closed positions respectively. With a "1" assigned as a code to a closed contact and an "0" assigned to an open contact, it can be seen that the complete code for the lower front edge of the card of FIG. 2, reading from left to right and beginning with the lower level and alternating with the upper level, would be "01100010 01110010," as indicated beneath FIG. 6.

When the card is turned so that the back of the card, as shown in FIG. 3, faces the front of the reading device 13, and the same edge inserted in the reader 13, an entirely different code is produced. This is because an entirely different set of perforated and nonperforated areas of the card are brought into registration with the pins 24. The code for this face of the card to the front would be "01100111 01011001." In other words, at one edge of the card 11 in the illustrated embodiment there are two perforatable code positions for each pin 24 with the alternate perforatable positions in each row adapted for alignment with the pins in the front and back positions of the card, respectively. However, one group of alternate perforatable code positions for holes 12 are aligned with the pins 24 in one position of the card and the other group of alternate perforatable code positions for holes are aligned with the pins when the card is reversed. Thus, one combination of holes 12 in the card 11 are read by the pins 24 in one position of the card and a different and independent combination of holes in the card are read by the pins when the card is reversed. By taking the card 11 of FIG. 2 and rotating it 180 degrees in the plane thereof and inserting the top edge in the reader 13, a third and different code would be produced. Similarly, a fourth and different code would be produced by placing the top edge of the card with the back thereof to the front. Thus, four different codes each containing sixteen elements can be produced by using two edges of a single card. Furthermore, other things being equal, the punched cards are structurally stronger as the edges are intact or continuous and have no sharp corners as in the notched cards heretofore available. Conversely, since such strength is not required in the cards, they can be made of paper rather than steel and information recorded directly thereon. Also, paper cards are much easier to code or punch than the steel plates formerly used. Furthermore, it is possible to typewrite or print directly on the body of a card appropriate information pertaining to various flights or legs of flights, as indicated by the dotted outlined blocks in FIGS. 2 and 3.

From the above description of the preferred embodiment it will be apparent that the present invention provides a card and reader that has considerably more utility and is more economical than cards and readers heretofore available, and that modifications can be made therein without departing from the spirit or essential attributes, and it is desired therefore that only such limitations be placed thereon as are imposed by the appended claims.

What is claimed is:

1. In combination, a card reader having a plurality of spaced apart rows of card perforation reading pins with the pins in one of said rows offset laterally with respect to the pins in the other of said rows, and a card having a plurality of perforatable code positions along at least one edge thereof in rows corresponding to the number of said rows of said reading pins, said card having perforatable code positions corresponding to the position of said pins and between said pins in each row, and means operated by the pins and controlled by the offset relationship of said reading pins and perforatable code positions on the card in one combination when the card perforations are read by the pins from one side thereof and in a different and independent combination when the card perforations are read by the pins from the other side thereof.

2. In combination, a card reader having a card receiving slot and a plurality of card perforation reading elements, said reading elements being spaced apart and arranged in a predetermined relationship with respect to each other to read perforations in a card placed in said slot, a card having at least two perforatable codable positions for each reading element in the area common to said reading elements to provide separate sets of said positions with each set corresponding in number and arrangement to the number and arrangement of said reading elements respectively, and means operated by the card reading elements and dependent upon which face of said card is presented to said reading elements to read either one or the other of said separate sets of perforations in the card.

3. In combination, a card reader having a card receiving slot and a plurality of pins for sensing perforations in a card in said slot, said pins being arranged in two longitudinal rows with the pins of one row being laterally offset with respect to those in the other row, a card having two longitudinal rows of perforatable code positions overlying and between said pins, and said arrangement of pins and card controlling operation of said sensing pins by perforations in both of said rows of code positions in one combination of code positions when one face of said card is presented thereto and in a different combination of code positions when the other face of said card is presented to said pins.

4. The combination as set forth in claim 3, and including the arrangement of said pins whereby any one perforation in said card is sensed by said pins from only one side of said card.

5. In combination, a card reader having a card receiving slot and a plurality of pins for sensing perforations in a card in said slot, said pins being arranged in two longitudinal rows with the pins of one row being laterally staggered with respect to the pins in the other row, a card having rows of perforations in operative alignment with and between said pins when in said slot, said card having some of said perforations assigned to one code group and the other perforations assigned to another code group, and the operation of said pins being dependent upon which face of said card is presented to said pins for determining which one of said two code groups is sensed by said pins.

6. In combination, a card reader having a card receiving slot and a plurality of pins for sensing perforations in a card in said slot, a perforated card having one set of perforations only of the perforations therein in operative alignment with said pins when in said slot with one face presented to said pins and another set of perforations only of said perforations in operative alignment with said pins when the other face of said card is presented to said pins.

7. The combination as set forth in claim 6, and wherein said separate sets of perforations are in contiguous and intermixed areas of said card.

8. In combination, a card reader adapted to receive code perforated cards and having a plurality of sensing elements adapted to sense individual code areas of a predetermined section of a card presented thereto, means including the position of said sensing elements to sense perforations in predetermined ones of said code areas in said predetermined card section when one face of said card is subjected to said sensing elements and to sense the others of said code areas in said predetermined card section when the other face of said card is subjected to said sensing elements.

References Cited in the file of this patent

UNITED STATES PATENTS

| | | |
|---|---|---|
| 1,926,882 | Peirce | Sept. 12, 1933 |
| 2,288,770 | Armbruster | July 7, 1942 |
| 2,706,599 | Smith | Apr. 19, 1955 |